United States Patent
Wang (10) Patent No.: US 9,850,398 B2
(45) Date of Patent: Dec. 26, 2017

(54) POWDERLESS COATING POLYMER AND POWDERLESS GLOVE COMPRISING THE SAME

(71) Applicant: Nicholas Wang, Kaohsiung (TW)

(72) Inventor: Nicholas Wang, Kaohsiung (TW)

( * ) Notice: Subject to any disclaimer, the term of this patent is extended or adjusted under 35 U.S.C. 154(b) by 97 days.

(21) Appl. No.: 14/826,714

(22) Filed: Aug. 14, 2015

(65) Prior Publication Data

US 2016/0304738 A1   Oct. 20, 2016

(30) Foreign Application Priority Data

Apr. 17, 2015 (TW) .............................. 104112377 A
May 15, 2015 (TW) .............................. 104115536 A (51) Int. Cl.
| | | |
|---|---|---|
| C09D 147/00 | (2006.01) | |
| A41D 19/00 | (2006.01) | |
| C08K 5/00 | (2006.01) | |
| C08K 3/22 | (2006.01) | |
| C08K 5/47 | (2006.01) | |
| C08K 5/39 | (2006.01) | |
| C08K 3/30 | (2006.01) | |

(52) U.S. Cl.
CPC .............. C09D 147/00 (2013.01); C08K 3/22 (2013.01); C08K 5/0025 (2013.01); A41D 19/0055 (2013.01); C08K 3/30 (2013.01); C08K 5/39 (2013.01); C08K 5/47 (2013.01); C08K 2003/2296 (2013.01)

(58) Field of Classification Search
CPC .............. C09D 147/00; A41D 19/0055; C08K 2003/2296
See application file for complete search history.

(56) References Cited

U.S. PATENT DOCUMENTS 5,567,494 A * 10/1996 Ageishi .............. G03G 15/0233
                                                        219/216

* cited by examiner

*Primary Examiner* — Robert Harlan
(74) *Attorney, Agent, or Firm* — Juan Carlos A. Marquez; Marquez IP Law Office, PLLC (57) ABSTRACT

The present invention provides a powder-free polymeric coating comprising a latex polymer, a metal oxide and a cross-linking agent, the latex polymer comprising a diene and an acrylic acid; and a powder-free glove comprising the powderless coating polymer.

14 Claims, 6 Drawing Sheets

POWDERLESS COATING POLYMER AND POWDERLESS GLOVE COMPRISING THE SAME

FIELD OF INVENTION

The present invention relates to a powder-free coating polymer comprising a latex polymer, a metal oxide and a cross-linking agent, the latex polymer including a diene and an acrylic acid; and a powder-free glove comprising a powder-free coating polymer.

BACKGROUND OF INVENTION

In current society, with progress of medical treatment, medical behaviors in relative to surgical operations have greatly increased, demands for medical supplies such as medical gloves are also increased, and requirements for the quality of the medical gloves are more stringent as well.

In the prior art, most of the polymeric coating materials used for fabricating medical gloves are mainly a acylate and urethane based material However, as acrylate and urethanes based coting material are high-modulus polymers, medical gloves fabricated by using the same may exhibit a problem of surface coating flaking off when being worn. For the medical gloves, coating flaking off may produce fine and loose particles, and the fine particles may fall onto a wound of a patient, thereby causing the wound being hardly healed and occurrence of other complications, therefore the gloves cannot meet medical standards.

In additional, the existing medical gloves are considerably sensitive to moisture in the atmosphere. A slight increase in humidity of the air, when the medical gloves are worn, may cause skin adhesion thereby causing problems such as difficulty in wearing and removing.

Therefore, talcum powders, corn flours or the like are often used so as to solve the problem of adhesion to the skin when the gloves are worn. However, the talcum powders, or corn flours may fall onto a wound of a patient, thereby causing the wound hardly being healed and occurrence of other complications.

As a result, most of the coating materials available in the market cannot provide a good water and moisture absorption characteristic, to prevent adhesion to the skin when the gloves are worn. Moreover, during the long operation time, maintaining dryness of a surgeon's hand is a very critical and important issue, most importantly, dry skin can prevent bacteria multiplication.

In addition, due to long glove wearing time by a surgeon, the glove should not only possesses water and moisture absorption properties, but also should not cause excessive dryness, so as to maintain skin health of the surgeon. Therefore, the glove should not only possesses water and moisture absorption properties, but also provide a comfortable wearing experience. However, the gloves made from the existing materials cannot satisfy the foregoing demands.

SUMMARY OF INVENTION

The present invention discloses a powder-free coating polymer and a powder-free glove comprising the same.

According to an embodiment of the present invention, the powder-free coating polymer may comprise a latex polymer, a metal oxide and a cross-linking agent, wherein the latex polymer may comprise a diene and an acyclic acid. The diene may be selected from the group consisting of butadiene, polybutadiene, polybutadiene derivative, and isoprene; the acyclic acid may be selected from the group consisting of 2-hydroxylethyl methacrylate, polyacrylate, polyacrylate derivative, acrylic acid derivative, methacrylic acid, acrylonitrile, butyl acrylate, and 2-ethylhexyl acrylate; the metal oxide may be zinc oxide, wherein the mixing ratio (part per hundred of rubber, phr) of the zinc oxide to the latex polymer may be 0.05 to 0.75; a pH regulator may be added so as to control the pH value within 10.00 to 12.00, wherein the pH regulator may be selected from the group consisting of potassium hydroxide, ammonium hydroxide, and sodium hydroxide, and the mixing ratio of the pH regulator to the latex polymer may be 0.05 to 0.60; the cross-linking agent may be an accelerator that will promote sulphur crosslinking, wherein the accelerators may be selected from the group consisting of zinc diburyldithiocarbamate (ZDBC), zinc 2-mercaptobenzothiazole (ZMBT) and sulfur; the mixing ratio of the zinc diburyldithiocarbamate to the latex polymer may be 0.05 to 1.00; the mixing ratio of the zinc 2-mercaptobenzothiazole to the latex polymer may be 0.05 to 1.00; and the mixing ratio of the sulfur to the latex polymer may be 0.05 to 2.00; and reaction products (Wingstay-L, WL) of p-cresol and dicyclopentadiene and isobutylene may be added, wherein the mixing ratio of the reaction products of p-cresol and dicyclopentadiene and isobutylene, to the latex polymer may be 0.25 to 2.00.

According to an embodiment of the present invention, in the method of producing a powder-free coating polymer, the aforementioned diene and acrylic acid, a metal oxide, a cross-linking agent, a pH regulator, and a commonly used emulsifier, an initiator, and a reaction promoter may also be added, so as to prepare a powder-free coating polymer of the present invention through an emulsion polymerization.

According to an embodiment of the present invention, a powder-free glove may comprise the aforementioned powder-free coating polymer. A glove made from a synthetic rubber (for example, Acrylonitrile butadiene rubber (NBR), polyisoprene rubber, polyurethane rubber (PU), styrene butadiene rubber (SBR), chloroprene rubber (CR) and butadiene rubber (BR), and the like), is coated with the foregoing powder-free coating polymer on an internal surface thereof, in which the powder-free glove of the present invention is produced by means of a commonly used technology for glove manufacturing process.

DETAILED DESCRIPTION OF THE INVENTION

Embodiments of the present invention are described with reference to the accompanying drawings. However, the present invention may also include different forms, and the embodiments illustrated herein shall not be construed as a limitation on the present invention. More exactly, these embodiments are provided so as to thoroughly, completely disclose and fully convey the scope of the present invention to a person skilled in the art.

The following describes in detail a powder-free coating polymer comprising a latex polymer, a metal oxide and a cross-linking agent, the latex polymer comprising a diene and an acrylic acid; and a powder-free glove comprising a powder-free coating polymer.

According to an embodiment of the present invention, a powder-free coating polymer may comprise a latex polymer, wherein the latex polymer includes a diene and an acrylic acid, a metal oxide and a cross-linking agent. The details are specifically described as follows.

Preparation of the Latex Polymer

Sodium dodecyl-benzenesulfonate (25 g), sodium persulfate (15 g) and water (3,000 g) are charged into a reactor, and stirred after the reactor is covered. The reactor is heated to 30° C., and created a vacuum environment, and a reaction promoter is then added thereto.

A pre-emulsified monomer is then added in a manner of successive dosing for 8 h. The composition of the emulsified monomer comprises butadiene (1,950 g), isoprene (195 g), 2-hydroxyethyl methacrylate (660 g), 2-ethylhexyl acrylate (330 g), acrylic acid (150 g), sodium dodecyl-benzenesulfonate (15 g), and a mercaptan (12 g) selected from 1-propanethiol, 1-butanethiol, and so forth, till 1-dodecanethiol.

After the emulsified monomer is added completely, the reactor is then added with sodium dodecyl-benzenesulfonate (7.5 g) for continuous reaction over 8 h. Sodium dodecyl-benzenesulfonate (3.75 g) and sodium persulfate (15 g) are added for further reaction over 7 h. The resulting mixture is then cooled to room temperature by using cold water, so as to obtain a latex polymer with 70% insoluble gel and a particle size of 150 nm.

Embodiment 1

For relevant proportion of compositions, please refer to Table 1 below.

TABLE 1

| Composition | Mixing ratio (phr) | Total solids content (TSC/TAS) | Dry weight (Dry g) | Wet weight (Wet g) |
|---|---|---|---|---|
| Latex polymer | 100.00 | 43.70% | 386.47 | 884.38 |
| Potassium hydroxide dispersion | 0.50 | 10.00% | 1.93 | 19.32 |
| Zinc oxide dispersion | 0.50 | 58.48% | 1.93 | 3.30 |
| Sulfur dispersion | 0.75 | 57.75% | 2.90 | 5.02 |
| Zinc dibutyldithiocarbamate dispersion | 0.50 | 49.16% | 1.93 | 3.93 |
| Zinc 2-mercaptobenzothiazole dispersion | 0.25 | 49.55% | 0.97 | 1.95 |
| Dispersion of reaction products of p-cresol and dicyclopentadiene and isobutylene | 1.00 | 42.72% | 3.86 | 9.05 |
| Soft water | 0.00 | N/A | 0.00 | 7073.05 |

7,073.05 g soft water is delivered into a mix tank, and 884.38 g latex polymer as prepared in the aforementioned description is filtered with a fine filter cloth and then delivered into the mix tank. After being stirred for 10 min at a high speed, 19.32 g potassium hydroxide dispersion is added therein and mixed for 10 min; 3.30 g zinc oxide dispersion is then added and mixed for 10 min; 5.02 g sulfur dispersion is added and mixed for 10 min; 3.93 g zinc dibutyldithiocarbamate dispersion is added and then mixed for 10 min; 1.95 g zinc 2-mercaptobenzothiazole dispersion is added and then mixed for 10 min; and 9.05 g dispersion of reaction products of p-cresol and dicyclopentadiene and isobutylene is added, and then mixed for at least 30 min at a high speed, so as to prepare a powder-free polymeric coating of Embodiment 1 of the present invention.

An internal surface (also known as donning side) of a polyisoprene rubber glove is coated with the foregoing powder-free coating polymer of Embodiment 1 of the present invention, in which a powder-free glove, that is, a product group 1 of the Embodiment 1, of the present invention is produced by means of a commonly used technology for glove manufacturing process.

Comparative Embodiment 1

An internal surface of a polyisoprene rubber glove is coated with a commonly used latex polymer, in which a glove, that is, a control group 1 of the Comparative Embodiment 1, is produced by means of a commonly used technology for glove manufacturing process.

Comparative Embodiment 2

An internal surface of a polyisoprene rubber glove is coated with a mixture of a commonly used latex polymer and acrylate coating, in which a glove, that is, a control group 2 of the Comparative Embodiment 2, is produced by means of a commonly used technology for glove manufacturing process.

Comparative Embodiment 3

An internal surface of a polyisoprene rubber glove is coated with a mixture of a commonly used latex polymer and polyurethane (PU), in which a glove, that is, a control group 3 of the Comparative Embodiment 3, is produced by means of a commonly used technology for glove manufacturing process.

Comparative Embodiment 4

An internal surface of a polyisoprene rubber glove is coated with a latex polymer as in the aforementioned description, in which a glove, that is, a control group of the Comparative Embodiment 4, is produced by means of a commonly used technology for glove manufacturing process.

The physical properties of the foregoing gloves of the product group 1, and the control groups 1, 2, 3 and 4, are tested, and the results are as shown in Table 2 below.

TABLE 2

| Test sample | 300% Stress (kg/cm$^2$) | 500% Stress (kg/cm$^2$) | Elongation at break (%) | Tensile strength (kg/cm$^2$) |
|---|---|---|---|---|
| Product group 1 | 14 | 37 | 845 | 262 |
| Control group 1 | 12 | 30 | 845 | 250 |
| Control group 2 | 14 | 36 | 845 | 242 |
| Control group 3 | 15 | 38 | 845 | 245 |
| Control group 4 | 14 | 34 | 845 | 260 |

It can be known from Table 2 that, performances of the product group 1, in respect to 300% stress, 500% stress and elongation at break, are able to meet commercial demands, and the product group 1 has a better tensile strength than the control groups 1, 2, 3 and 4.

After being treated by surface chlorination, the physical properties of the treated gloves of the product group 1, and the control groups 1, 2, 3 and 4, are tested with the same physical property test as Table 2 above, and the results are as shown in Table 3 below.

TABLE 3

| Test sample | 300% Stress (kg/cm²) | 500% Stress (kg/cm²) | Elongation at break (%) | Tensile strength (kg/cm²) |
|---|---|---|---|---|
| Product group 1 | 16 | 40 | 845 | 315 |
| Control group 1 | 17 | 39 | 884 | 305 |
| Control group 2 | 17 | 44 | 845 | 301 |
| Control group 3 | 15 | 44 | 845 | 282 |
| Control group 4 | 15 | 38 | 845 | 307 |

It can be known from Table 3 that, performances of the product group 1, in respect to 300% stress, 500% stress and elongation at break, are able to meet commercial demands, and the product group 1 has a better tensile strength than the control groups 1, 2, 3 and 4.

Without adding a lubricant, the friction coefficients of the gloves of the product group 1, and the control groups 1, 2, 3 and 4, are tested when being worn on the hand, and the results are as shown in Table 4 below.

TABLE 4

| Test sample | Static friction coefficient | Dynamic friction coefficient |
|---|---|---|
| Product group 1 | 0.03 | 0.06 |
| Control group 1 | 0.20 | 0.15 |
| Control group 2 | 0.12 | 0.04 |
| Control group 3 | 0.15 | 0.09 |
| Control group 4 | 0.03 | 0.03 |

It can be known from Table 4 that, the static friction coefficient and dynamic friction coefficient of the product group 1 are comparable to the static friction coefficient and dynamic friction coefficient of the control groups 1, 2, 3 and 4, which demonstrates that the product group 1 is able to conform to commercial standards. Even in the static friction coefficient test, the product group 1 is better than the commonly used control groups 1, 2 and 3, which demonstrates that the problems of skin adhesion and difficulty in wearing and removing are significantly reduced when wearing the product group 1 of the embodiment of the present invention.

The gloves of the product group 1, and the control groups 1, 2, 3 and 4, are treated with 600-800 ppm chlorine gas on the surface thereof, the surface treated gloves are then placed under a temperature of 70° C. over 24 hours for aging treatment, and then tested with a Sticky test on a scale of 1-Least Sticky and 5-Most Sticky, the results are as shown in Table 5 below:

TABLE 5

| Test sample | Wearing characteristics |
|---|---|
| Product group 1 | 2 |
| Control group 1 | 5 |
| Control group 2 | 3 |
| Control group 3 | 2 |
| Control group 4 | 2 |

It can be known from Table 5 that, the wearing characteristics of the product group 1 are better than those of the control groups 1, 2 and 3, showing that the product group 1 of the embodiment of the present invention is able to maintain a certain quality after aging treatment, proving that the product group 1 of this embodiment of the present invention is significantly more durable than the commonly used product.

Without adding a lubricant, measurement of a contact angle is carried out for the gloves of the product group 1, and the control groups 1, 2, 3 and 4, the results are as shown in FIG. 1, and FIG. 2A to FIG. 2D, where the vertical axis represents the contact angle (unit: degree), and the horizontal axis represents the time (unit: second).

Figure 1:
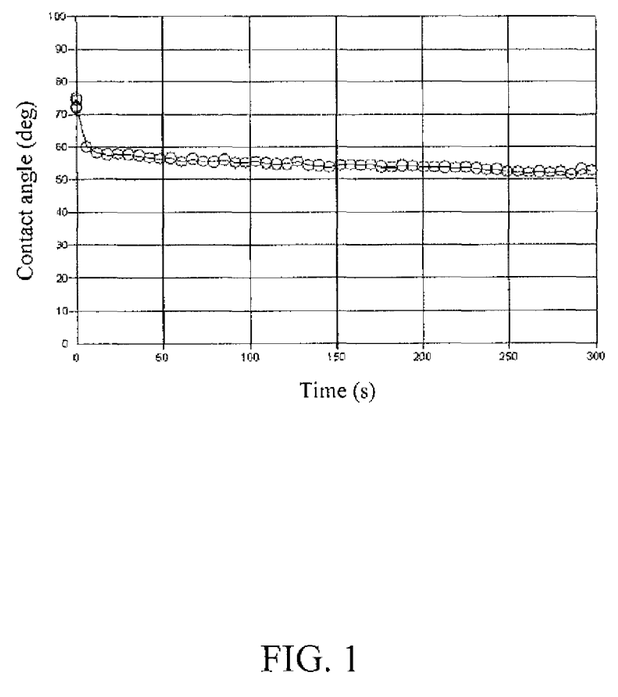
FIG. 1 is a graph showing the contact angle measurement of a product group 1.
Figure 2A:
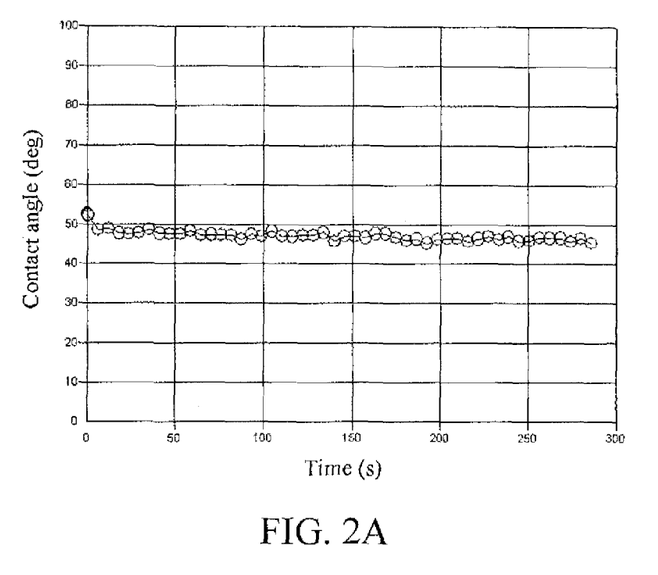
FIG. 2A is a graph showing the contact angle measurement of a control group 1.
Figure 2B:
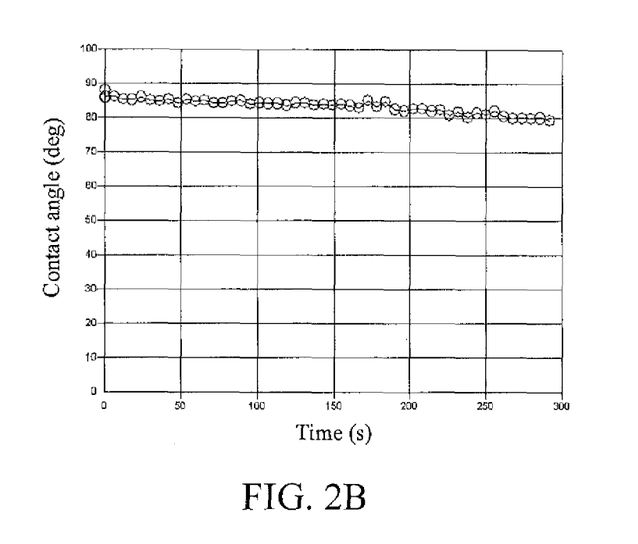
FIG. 2B is a graph showing the contact angle measurement of a control group 2.
Figure 2C:
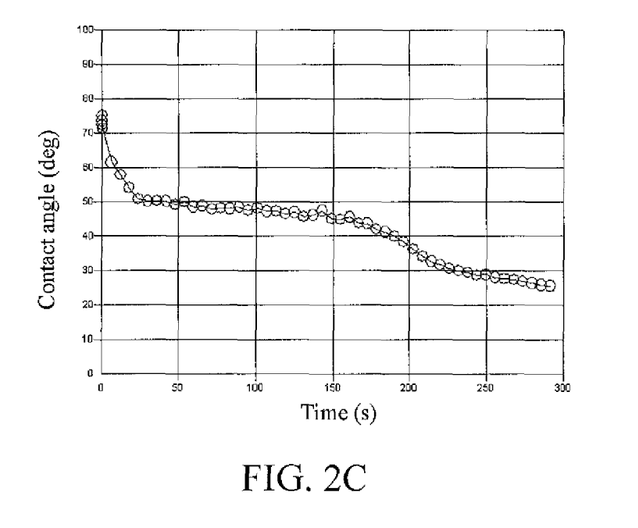
FIG. 2C is a graph showing the contact angle measurement of a control group 3.
Figure 2D:
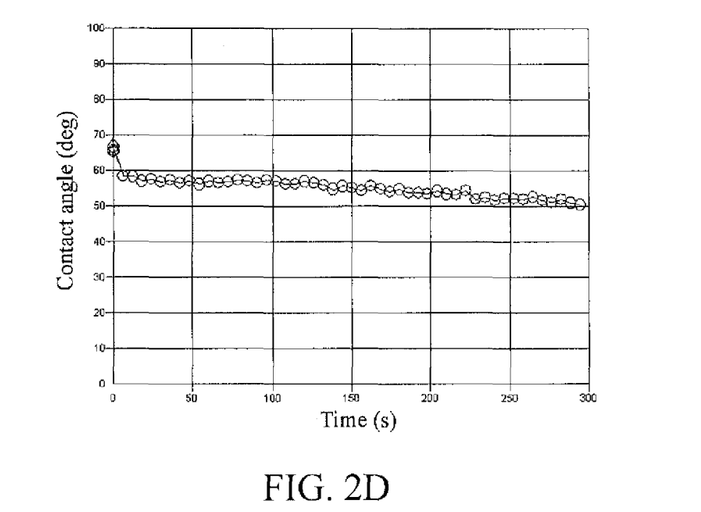
FIG. 2D is a graph showing the contact angle measurement of a control group 4.

FIG. 1 is a contact angle measurement graph of the product group 1, from which it can be known that a downtrend occurs in the contact angle of the product group 1, indicating that the product group 1 is prone to absorb water and possesses a hydrophilic material property; FIG. 2A is a contact angle measurement graph of the control group 1, and FIG. 2B is a contact angle measurement graph of the control group 2, where no obvious downtrend is observed, indicating that the control groups 1 and 2 are not prone to absorb water, and do not possess the hydrophilic material property, therefore a user may have an uncomfortable feeling when wearing the same; FIG. 2C is a contact angle measurement graph of the control group 3, where a downtrend thereof is excessively large, indicating that the control group 3 has an overly high water absorption capacity, and easily causes the skin to become overly dry; FIG. 2D is a contact angle measurement graph of the control group 4, where a contact angle downtrend thereof is more obvious than that of FIG. 2A and FIG. 2B, indicating that the control group 4 possesses water absorption capacity, but the water absorption capacity thereof is slightly inferior than that of the product group 1 of FIG. 1. As a result, it is demonstrated that the product group 1 of this embodiment of the present invention can meet the requirements for providing suitable and comfortable water and moisture absorption, and preventing excessive dryness.

An electron microscope was used to take a photo of an internal surface of the gloves of the product group 1, and the control groups 1, 2, 3 and 4. The photos taken were shown in FIG. 3, and FIG. 4A to FIG. 4D, where FIG. 3 is an electron microscope photograph of the product group 1, FIG. 4A is an electron microscope photograph of the control group 1, FIG. 4B is an electron microscope photograph of the control group 2, FIG. 4C is an electron microscope photograph of the control group 3, and FIG. 4D is an electron microscope photograph of the control group 4.

Figure 3:
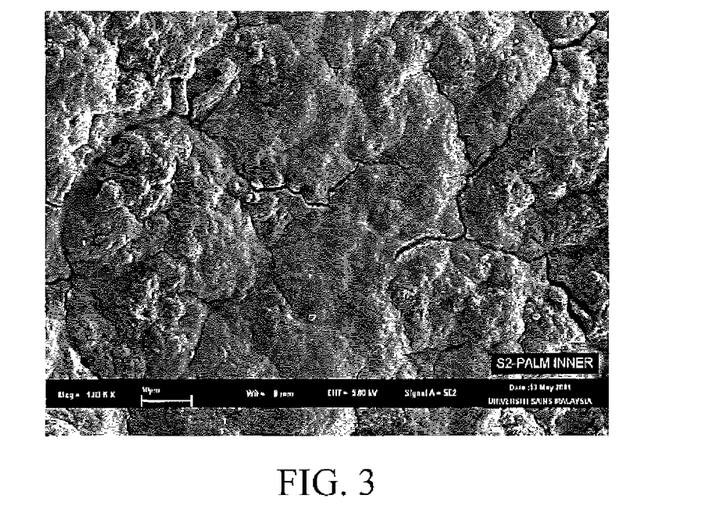
FIG. 3 is an electron microscope photograph of a product group 1.
Figure 4A:
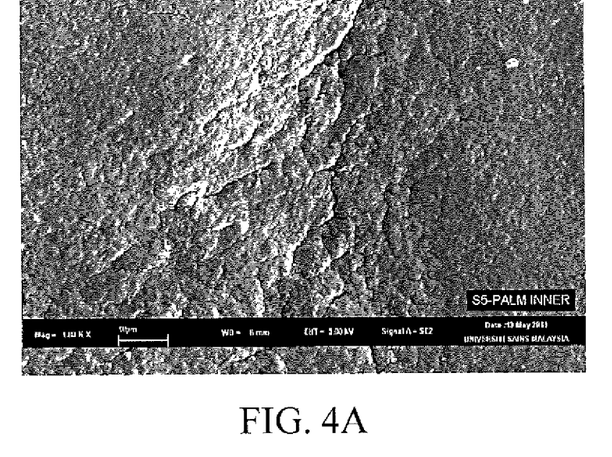
FIG. 4A is an electron microscope photograph of a control group 1.
Figure 4B:
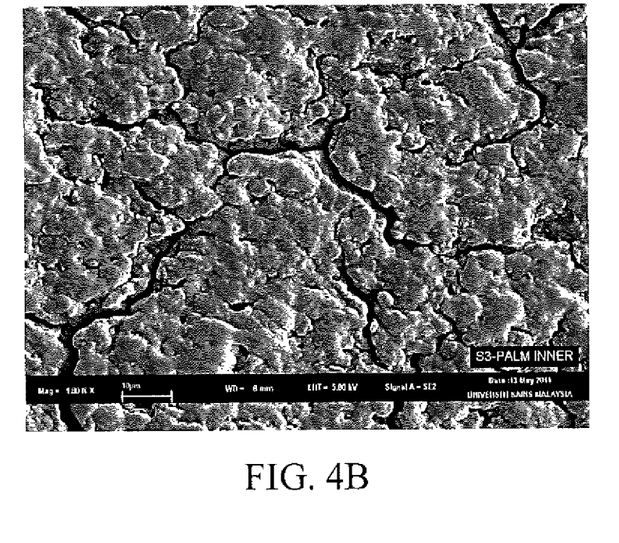
FIG. 4B is an electron microscope photograph of a control group 2.
Figure 4C:
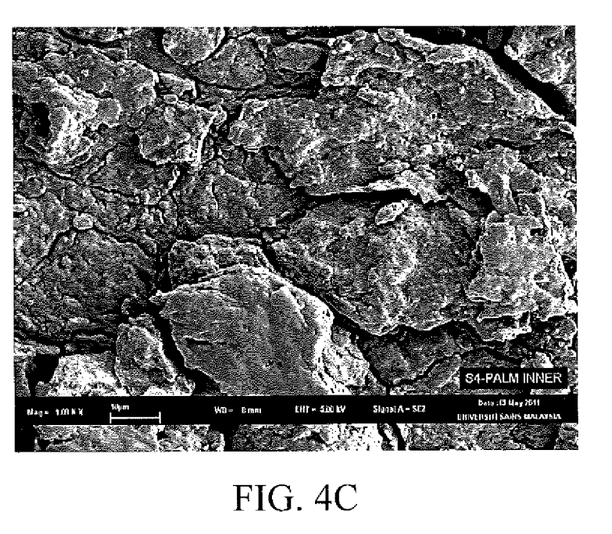
FIG. 4C is an electron microscope photograph of a control group 3.
Figure 4D:
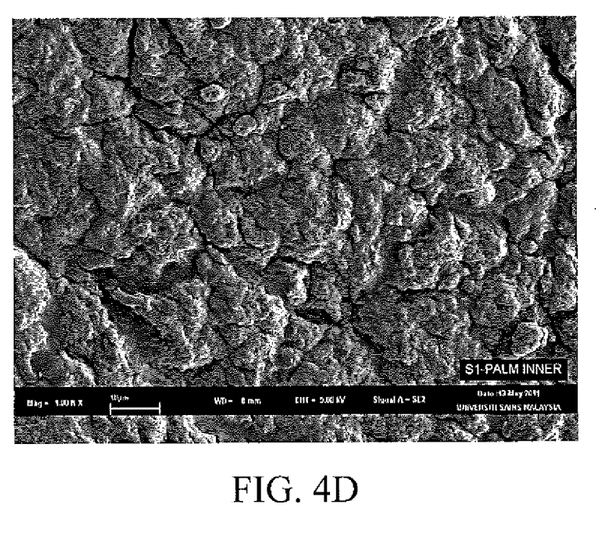
FIG. 4D is an electron microscope photograph of a control group 4.

According to FIG. 3, the electron microscope photograph of the product group 1 shows that the internal of the glove has a rough surface with evenly distributed particles of various sizes and slight cracks, and the rough internal surface may reduce the contact area between the glove and the skin of a surgeon wearing the same, thereby demonstrating that the product group 1 of this embodiment of the present invention has a suitable water and moisture absorption capacity; according to FIG. 4A, the electron microscope photograph of the control group 1 shows that the internal surface of the glove is smooth, having few rough sections, thereby demonstrating that the water and moisture absorption capacity of the control group 1 is poor, and the smooth internal surface of the glove may increase the contact area between the glove and the skin of a surgeon wearing the same, and moisture in the air and sweat excreted from the skin of a surgeon can cause the friction coefficient of the internal surface of the glove to increase, which may also lead to problems of adhesion and difficulty in wearing and removing; according to FIG. 4B, the internal surface of glove of the control group 2 has less cracks, thereby causing poor water absorption capacity, the rough internal surface of the glove causes the friction coefficient of the internal surface of the glove to increase, as a result of the large contact area between the glove and the skin of a surgeon wearing the same, and moisture in the air and sweat excreted from the skin of a surgeon, which may also lead to problems of adhesion and difficulty in wearing and removing; according to FIG. 4C, there are few cracks but a lot of large particles on the internal surface of the glove of the control group 3, causing overly fast water absorption; and according to FIG. 4D, the internal surface of the glove of the control group 4 has relatively even cracks distributed thereon, and the control group 4 possesses water and moisture capacity, but slightly causes excessive dryness; compared with the product group 1, the control group 4 is inferior in respect of dryness and comfort when excessive dryness is prevented.

To sum up, in comparison with the control groups 1, 2, 3 and 4, the product group 1 has an excellent and appropriate water and moisture absorption capability, and can prevent excessive dryness.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

From the above, the present invention has not been found in similar products in respect of integral combination and characteristics, and has not been published before filing an application. As a result, it conforms to legal conditions specified in the Patent Law, and the application of a patent for the invention is hereby filed according to the law.

What is claimed is:

1. A powder-free coating polymer, comprising:
   a latex polymer comprising at least one of an acrylate and an acrylic acid and at least one of a diene and a polymerized diene;
   a metal oxide; and
   a cross-linking agent, wherein the cross-linking agent is an accelerator that will promote sulfur crosslinking.

2. The powder-free coating polymer according to claim 1, wherein the at least one of a diene and a polymerized diene is selected from the group consisting of butadiene, polybutadiene, polybutadiene derivative, and isoprene.

3. The powder-free coating polymer according to claim 1, wherein the at the least one an acrylate and an acrylic acid is selected from the group consisting of 2-hydroxylethyl methacrylate, polyacrylate, polyacrylate derivative, acrylic acid derivative, methacrylic acid, acrylonitrile, butyl acrylate, and 2-ethylhexyl acrylate.

4. The powder-free coating polymer according to claim 1, wherein the metal oxide is zinc oxide.

5. The powder-free coating polymer according to claim 4, wherein the mixing ratio of the zinc oxide to the latex polymer is 0.05 to 0.75.

6. The powder-free coating polymer according to claim 1, wherein a pH regulator is added to control the pH value within 10.00 to 12.00.

7. The powder-free coating polymer according to claim 6, wherein the pH regulator is selected from the group consisting of potassium hydroxide, ammonium hydroxide, and sodium hydroxide.

8. The powder-free coating polymer according to claim 7, wherein the mixing ratio of the pH regulator to the latex polymer is 0.05 to 0.60.

9. The powder-free coating polymer according to claim 1, wherein the accelerator is selected from the group consisting of zinc diburyldithiocarbamate, zinc 2-mercaptobenzothiazole and sulfur.

10. The powder-free coating polymer according to claim 9, wherein the mixing ratio of the zinc diburyldithiocarbamate to the latex polymer is 0.05 to 1.00.

11. The powder-free coating polymer according to claim 9, wherein the mixing ratio of the zinc 2-mercaptobenzothiazole to the latex polymer is 0.05 to 1.00.

12. The powder-free coating polymer according to claim 9, wherein the mixing ratio of the sulfur to the latex polymer is 0.05 to 2.00.

13. The powder-free coating polymer according to claim 1, wherein reaction products of p-cresol and dicyclopentadiene and isobutylene are added.

14. The powder-free coating polymer according to claim 11, wherein the mixing ratio of the reaction products of p-cresol and dicyclopentadiene and isobutylene, to the latex polymer is 0.25 to 2.00.

* * * * *